United States Patent [19]

Karls

[11] 4,077,545
[45] Mar. 7, 1978

[54] INSTANT HOT WATER DISPENSING SYSTEM

[75] Inventor: Robert F. Karls, Hales Corners, Wis.

[73] Assignee: Emerson Electric Co., Hales Corners, Wis.

[21] Appl. No.: 725,591

[22] Filed: Sep. 22, 1976

[51] Int. Cl.² .............................................. B67D 5/62
[52] U.S. Cl. ................... 222/144.5; 137/339;
137/341; 137/625.41; 137/801; 219/296;
219/306; 222/146 HE
[58] Field of Search ................ 222/144.5, 145, 146 R,
222/146 H, 146 HE, 146 HS, 330, 571;
126/351; 285/21; 137/339, 341, 625.41, 606,
801; 239/444–447, 312; 219/306–309, 296–299,
312, 316

[56] References Cited

U.S. PATENT DOCUMENTS

| | | | |
|---|---|---|---|
| 1,595,212 | 8/1926 | Murray | 222/571 X |
| 1,793,747 | 2/1931 | Prentice | 222/146 HS |
| 2,555,563 | 6/1951 | Benton | 222/330 X |
| 2,822,112 | 2/1958 | Bremer | 222/146 HE X |
| 2,839,081 | 6/1958 | Wolf | 137/625.41 X |
| 2,903,551 | 9/1959 | Fischer | 222/146 HE |
| 3,144,967 | 8/1964 | McClain | 222/144.5 |
| 3,202,318 | 8/1965 | Black | 222/330 X |
| 3,202,321 | 8/1965 | Homeyer | 222/146 HS X |
| 3,285,521 | 11/1966 | Coakley | 239/446 X |
| 3,461,901 | 8/1969 | Bucknell et al. | 137/801 X |
| 3,642,176 | 2/1972 | Dreibelbis et al. | 222/146 HE |
| 3,870,075 | 3/1975 | Percival et al. | 137/606 |
| 4,005,804 | 2/1977 | Dreibelbis | 222/146 R X |

*Primary Examiner*—Robert B. Reeves
*Assistant Examiner*—Fred A. Silverberg
*Attorney, Agent, or Firm*—Wheeler, Morsell, House & Fuller

[57] ABSTRACT

An instant hot water dispenser system utilizes the same spout to dispense instant hot water as is used to dispense water from the plumbing system of the building and mixtures thereof. The instant hot water dispenser utilizes a small electrically heated hot water tank located adjacent to the faucet and includes a faucet spout having an inside passage for dispensing instant hot water and an outer passage for dispensing plumbing system water. The outer water passage provides an insulating water jacket surrounding the instant hot water passage to prevent high temperatures of the spout surface and eliminate the possibility of burns to the user. Various valving arrangements are disclosed to dispense through the spout plumbing system water only, instant hot water only, a mixture of instant hot water and plumbing system water, etc.

16 Claims, 6 Drawing Figures

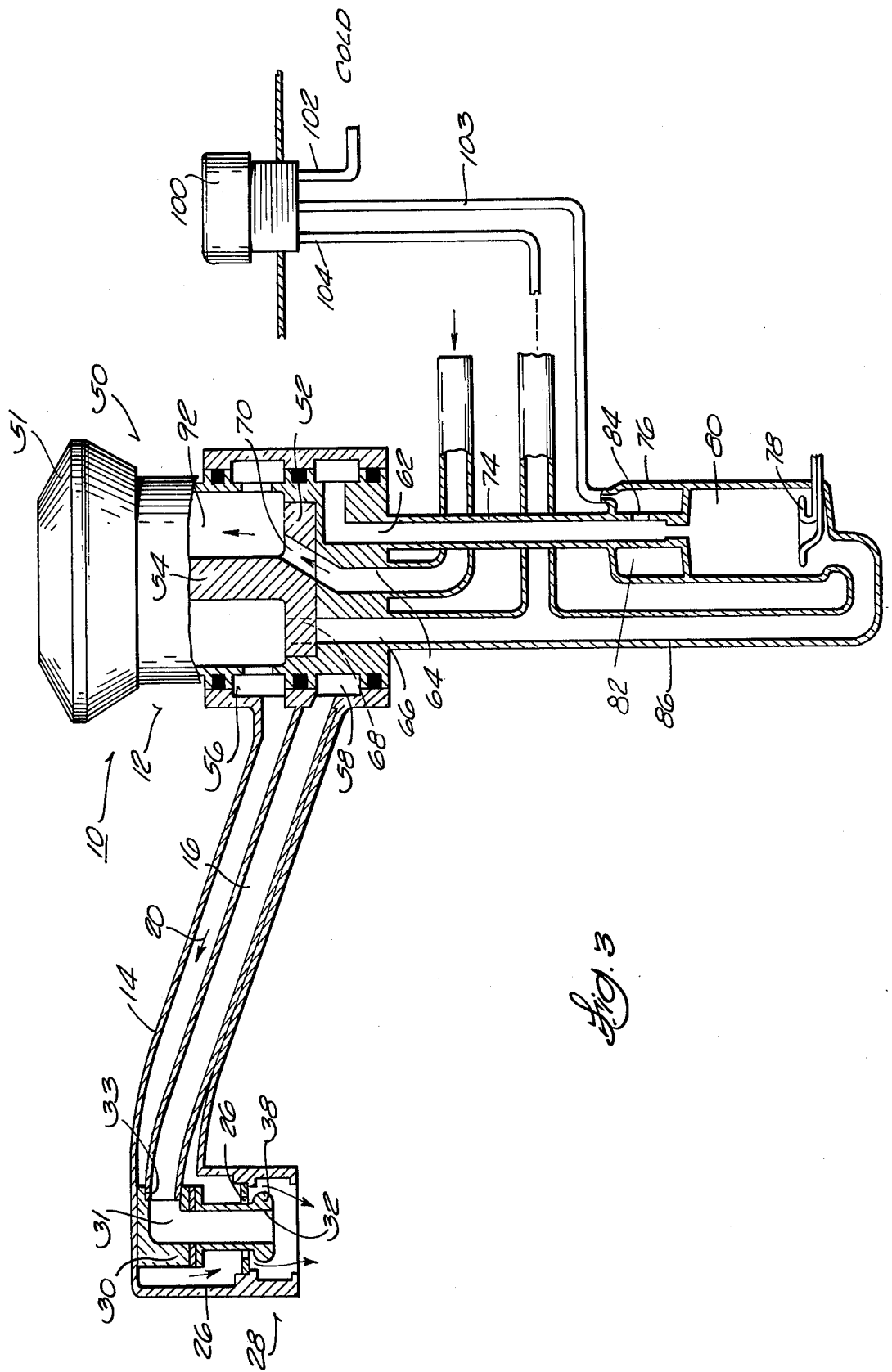

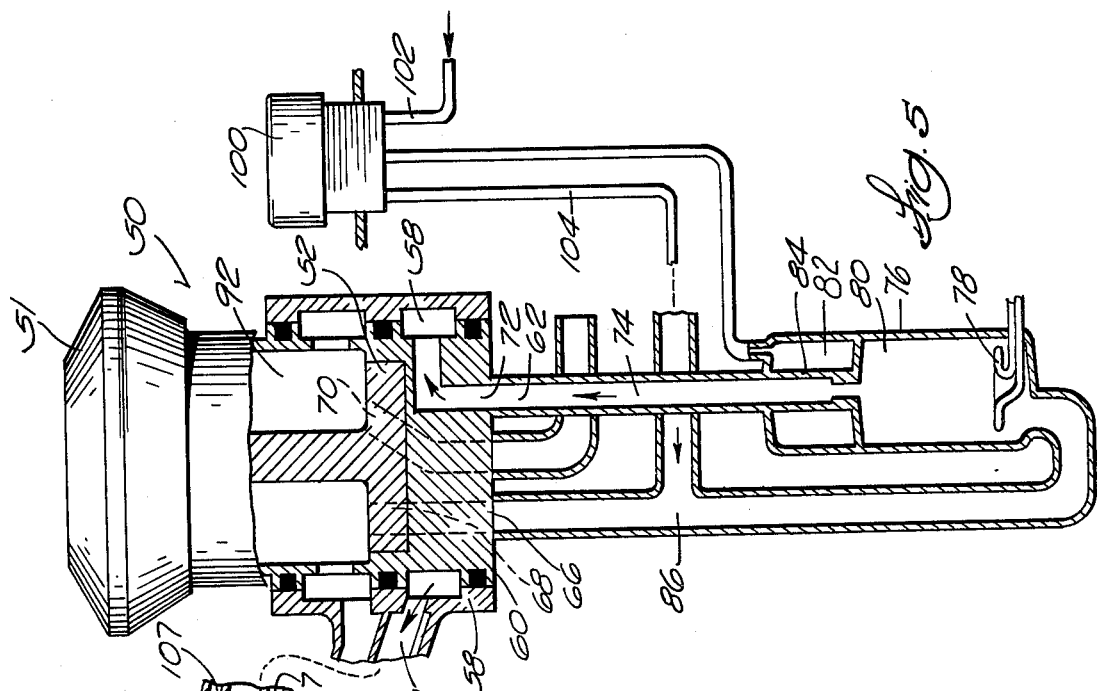
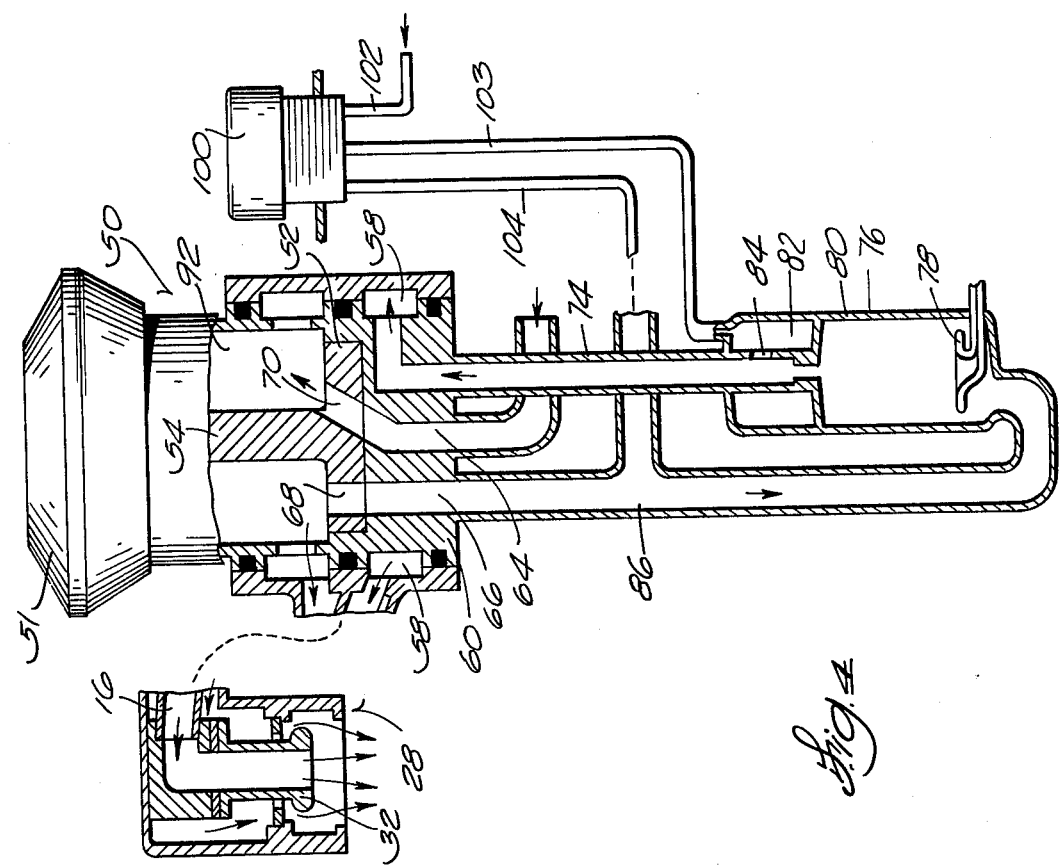

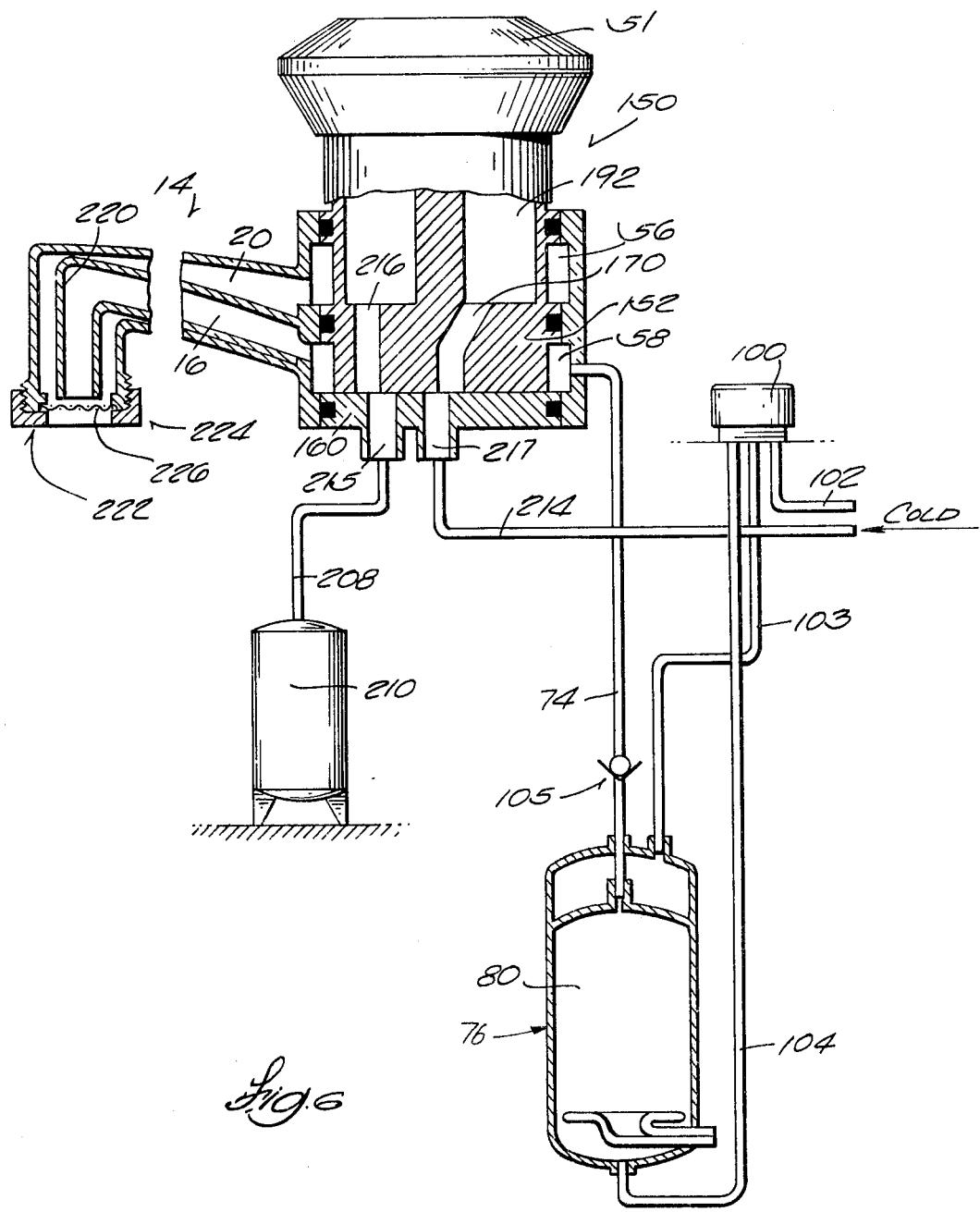

INSTANT HOT WATER DISPENSING SYSTEM

BACKGROUND OF INVENTION

Presently commercially available instant hot water heaters employ a separate faucet or spout to dispense 190° F or 200° F water from a small electrically heated hot water tank under the sink. The spout is typically mounted on the conventional sink which also includes the usual faucet for dispensing water from the building plumbing system. The instant hot water spout operates independantly of the usual faucet. There can be a danger of burns to the user caused by either inadvertent contact with the instant hot water spout or contact with the discharged hot water. Conventional hot water systems used in some nursing homes and hospitals require a separate and costly scald guard or pressure balancing valve to prevent scalding. A standard hot/cold system also requires two input lines to the faucet in order to obtain both hot and cold water at the sink or receptacle. Since the hot water tank is located in a remote area, considerable expense is involved to bring piping to each sanitary location. The remoteness of the hot water tank also causes a long wait for hot water when the faucet is turned on. This occurs due to the fact that water left in the pipe cools and the hot water leaving the tank must travel a long distance to the faucet. It loses much of its initial heat content thru heat loss to the pipe as it travels through. This is also a large energy waste in any conventional system in both water wasted while the pipes heat up and in the energy required to heat the water.

A conventional hot water system generally heats water to 140° F. This temperature is much too hot to use directly as it will cause burns and therefore must be manually mixed in the faucet, with the cold water, to provide a warm water mix. This also wastes water and energy. The presence of 140° F. plus water at the faucet is also a definite hazard in that it can cause scalding and sudden reactions, especially in older people. This sudden reaction has resulted in numerous injuries in the past.

SUMMARY OF INVENTION

The water dispenser of the invention employs a single faucet spout for building plumbing system water and instant hot water. A small electrically heated water tank supplies instant hot water at 190° F. - 200° F. It also can supply instant hot water for mixing with plumbing system cold water to produce a warm water discharge. In this circumstance the invention eliminates the need for connection of the faucet to the remote plumbing system hot water tank if large quantities of hot water are not required. The faucet spout employed has an inner tube or passage which delivers instant hot water to the dispensing head and an outer plumbing system water passage which surrounds the instant hot water tube. The outer passage serves as a water jacket to maintain the outer surface of the spout at a temperature less than the temperature of the instant hot water, thus to prevent burns caused by contact with an instant hot water spout.

In one embodiment of the invention the dispensing system has two operational modes, i.e. plumbing supply cold water only or plumbing supply cold and instant hot water mixed, to provide a warm water discharge. In this mode plumbing supply cold water always flows from the spout first thus preventing scalding. As the cold water exits, a mixing structure in the faucet outlet causes the water to flow in a tortuous path around a curved bead to areate the water and cause turbulence. The instant hot water enters the turbulent cold water and is mixed with the cold water. The resulting mix of warm water is obtained almost instantly with no scalding possibilities.

In a second embodiment of the invention there are three operational modes: (1) plumbing supply cold water only, (2) plumbing supply cold water and instant hot water simultaneously to form a warm water mix and (3) instant hot water alone.

In a third embodiment, the faucet is connected to the building plumbing supply remote hot water tank as well as to the cold water pipe for conventional faucet usage with hot and cold water and mixture thereof as well as instant hot water. This embodiment is preferred when large quantities of hot water are required.

In some embodiments a separate valve controls flow of instant hot water through the faucet spout when the faucet shuts off the supply of plumbing system water.

In all embodiments the outside water jacket maintains the spout surface at a safe temperature to prevent burns caused by touching the spout.

Further objects, advantages and features of the invention will be apparent from the disclosure hereof.

DESCRIPTION OF THE DRAWINGS

FIG. 3 is a diagramatic view of the second embodiment of the invention in which the dispensing system has three operational modes. The faucet valve is shown in the cold water dispensing mode.

FIG. 4 is a view of the dispensing system shown in FIG. 3 with the faucet valve in the warm water dispensing mode.

FIG. 5 is a view of the system shown in FIG. 3 with the dispenser in the hot water dispensing mode.

FIG. 6 is a diagramatic view of a further modified embodiment of a water dispenser which includes connection to a conventional central hot water tank.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
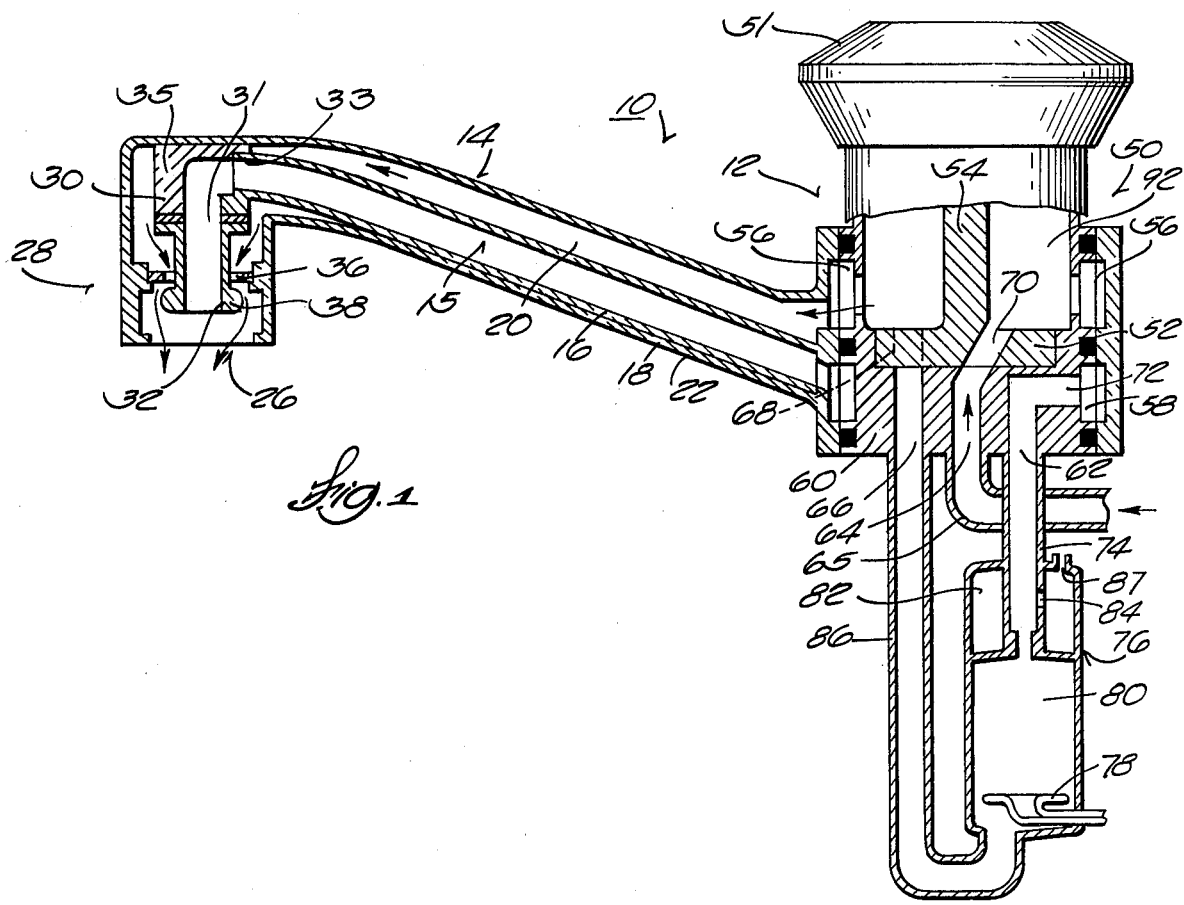
FIG. 1 is a diagramatic view in fragmentary section of a water dispensing system in accordance with the first embodiment of the invention with the faucet valve in a cold water only dispensing mode.

FIG. 1 shows the first embodiment of the invention which requires only one cold water input line for its operation. The hot water tank is directly adjacent (underneath) the sink or receptacle. The piping to the faucet comprises short lengths of pipe instead of the long lengths as are required in conventional hot/cold water systems. These design features, therefore, reduce the overall initial installation costs, save piping and space and greatly reduce the water and energy losses commonly inherent in a conventional system. This embodiment, although using 190° F. to 200° F. water in its tank, does not allow this water to be dispensed from the faucet. It instead provides an automatic mixing of the 190° F. water, with the cold supply water, to instantaneously furnish a warm water suitable for sanitary purposes.

There is no danger of scalding or sudden reaction with this system to an unsuspecting user.

The dispensing apparatus 10 includes a faucet 12 with a spout 14. The spout 14 includes an inside tube 16 which provides an instant hot water passage 15. Tube 16 is located within an outside spout tube 18. The outside tube 18 is spaced from the tube 16 to provide a water jacket chamber 20 which totally or partially surrounds the inside tube 16. In this embodiment, as well as other embodiments disclosed herein, the water jacket 20 supplies plumbing system water and hence contains water somewhat cooler than the instant hot water, thus to maintain the outside surface 22 of the spout at a moderate temperature to avoid burns or reflex action if touched by the user.

The inside tube 16 and outside tube 18 communicate with a common dispensing outlet 26 in a dispensing head 28. The dispensing head 28 includes a central core 30 which has a through passage 31 which is connected by an elbow 35 to the end 33 of the instant hot water tube 16, with the instant hot water exiting at the core outlet 32. The outlet 32 is surrounded by an annular bead 38 which partially obstructs water flow through the plumbing supply water ports 36 in the outwardly extending flange 38 on the core 30. The bead 38 provides a tortuous path for the water flow to cause turbulence and aeration of the water. The turbulence also causes mixing of plumbing system water with instant hot water when both exit from their respective outlets 32 and 36 into the dispensing outlet 26. The outlet 32 is spaced from the outlet 36 to prevent water discharged from one outlet from flowing into the other outlet.

The spout 14 is connected to a manually operated faucet valve 50 which includes a rotary valve core 52 connected to the handle or knob 51 by core stem 54. The valve includes a plumbing system water outlet passage 56 and instant hot water outlet passage 58. Passages 56, 58 surround the core 52. The valve 50 also contains a fixed inlet seat 60 having an instant hot water inlet port 62 communicating with passage 72, plumbing system cold water inlet port 64 connected to plumbing system cold water supply conduit 65 and plumbing system water exit port 66. The valve core 52 contains a plumbing supply water exit passage 68 and a plumbing system water inlet passage 70. In the FIG. 1 embodiment any hot water supply in the building plumbing system is not extended to the faucet. The instant hot water tank 76 is the sole source of hot water.

The instant hot water inlet port 62 is connected by a conduit 74 to the instant hot water tank 76. As shown in the drawings, the instant hot water tank 76 is considerably reduced in scale as compared to the faucet for convenience in illustration. The instant hot water tank 76 normally contains ½ gallon or more of hot water and the faucet is of conventional size for kitchen or lavatory type faucets. The instant hot water tank 76 includes an electric heating element 78 controlled by a thermostat (not shown). The tank 76 has a main chamber 80 and an expansion chamber 82. When the water in chamber 80 is heated, the hot water expands approximately 3% in volume and enters and partially fills the expansion chamber 82 through a port 84 in conduit 74. The expansion chamber 82 is provided with an air vent 87. A pressure relief valve is not required, inasmuch as there is no pressure build up in the hot water tank. Plumbing system cold water is supplied to the instant hot water tank for heating and for forcing instant hot water into the spout via conduit 74 as hereinafter described.

In FIG. 1 the valve core 52 is positioned to dispense plumbing system cold water only through spout passage 20. In the FIG. 1 position the plumbing system water eixt port 66 is blocked. The passage 72 is always open. The plumbing system cold water inlet port 64 is open and cold water flows from conduit 65 into the chamber 92 and out the passage 56 into the outside water passage 20 of the spout 14.

Figure 2:
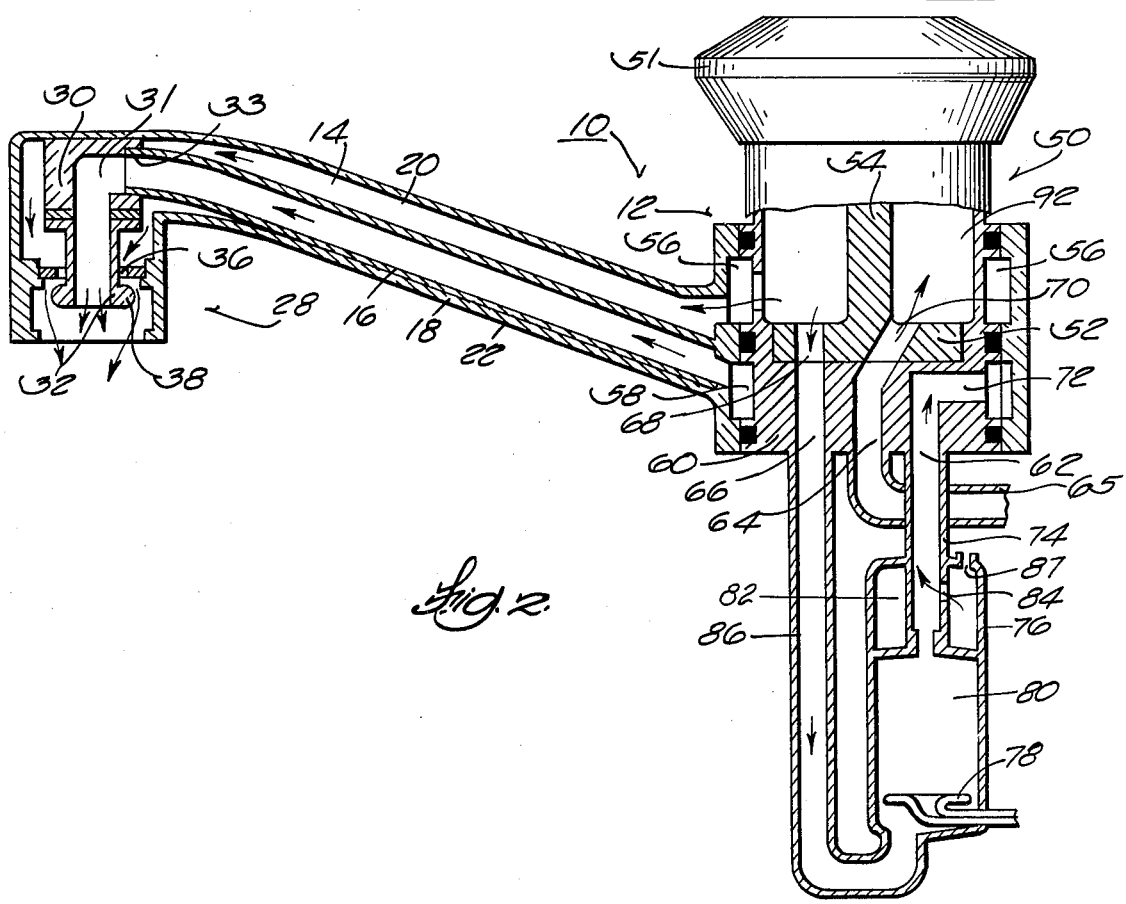
FIG. 2 is a view similar to FIG. 1 with the faucet valve in a warm water dispensing mode.

FIG. 2 illustrates the same embodiment as in FIG. 1, but with the valve 50 turned to a different dispensing mode. In FIG. 2 the valve core 52 is rotated to a position to simultaneously supply both instant hot and plumbing system cold water to the faucet outlet 26. The instant hot water port 62 is always open and provides instant hot water flow through passage 72 to the passage 58 to supply instant hot water to the inside tube 16. The hot water is forced from tank 76 by cold water flow from the chamber 92 downwardly through passage 68 from chamber 92 into the conduit 86. When water is present in chamber 92, there is sufficient back pressure caused by small ports 36 to cause the water to flow from chamber 92 down conduit 86 into the instant hot water tank 76 when passage 68 is in registry with port 66.

When instant hot water is forced out of the tank 80 by water pressure in conduit 86, in the FIG. 2 valve position, instant hot water flows through the conduit 74 and past the port 84 to cause aspiration of water from the expansion chamber 82 through the port 84 and into the conduit 74. Water flow past the port 84 causes a negative pressure at the port 84 less than the atmospheric pressure of the vented expansion chamber 82 to cause the aspiration. The expansion chamber of water is filled during the next heating cycle.

In the FIG. 2 valve position the instant hot water flowing through the tube 16 exits from the outlet port 32 and is mixed with the turbulent cold water flowing around the bead 38.

With the faucet embodiment disclosed in FIGS. 1 and 2, the plumbing system cold water always exits the dispensing outlet first and prior to any discharge of hot water. This prevents scalding of the user. The temperature of the cold and hot water mix exiting the dispensing head depends on the temperature of the cold water supply and the temperature of the hot water in the hot water tank which can be varied depending on the thermostat setting.

The embodiment disclosed in FIGS. 1 and 2 provides cold water or cold water and hot water mixed. There is no provision for dispensing instant hot water only. Accordingly, there is no possibility of the spout becoming hot or of hot water only issuing from the spout to become a hazard to user.

The embodiment disclosed in FIGS. 3, 4 and 5 has three operational modes; namely, (1) cold water only, (2) hot water only, and (3) hot water and cold water mixed to provide a warm water discharge. As in the first embodiment of FIGS. 1 and 2, this embodiment does not require any connection to the plumbing system hot water tank, as all hot water is drawn from the instant hot water tank 80. However, in this embodiment, it is possible to dispense instant hot water only. This is particularly useful in making available sufficient hot water (190° F. to 200° F.) dispensed at the faucet to allow the mixing of instant foods and beverages such as coffee, tea, soup, hot chocolate, etc., without need for boiling water on a stove or the like. This embodiment includes a separate instant hot water dispensing valve 100 which is connected to the plumbing system cold water supply line 102 and has a cold water outlet line 104 which is connected to conduit 86 to cause cold water flow into the instant hot water tank 80 to cause discharge of instant hot water into conduit 74 and instant hot water passage 16 in spout 14 when the valve 100 is actuated as hereinafter described. The expansion chamber 76 is provided with a vent tube 103 which extends to and communicates with the atmosphere at the valve 100. In FIG. 3 the valve core 52 is in the first operational mode "cold water only" position with the valve core passage 70 in communication with the inlet port 64 to provide water flow into passage 56 via chamber 92. In the FIG. 3 valve position the rotational position of valve 50 is such that the plumbing system water exit port 66 is blocked and there is no hot water flow into the passage 16 of spout 14.

FIG. 4 shows the dispensing apparatus of FIG. 3 with the valve core 52 arranged to provide warm water. This is the third operational mode as mentioned above. The port 66 is open to provide cold water flow through tube 86 to force hot water from tank 80 through conduit 74, and aspirate hot water from chamber 82 to supply hot water to the inside tube 16 of spout 14 for discharge through the dispensing outlet 26. In the FIG. 4 mode cold water also flows through the cold water passage 20 of spout 14 for simultaneous dispensing with the hot water to provide a warm water mix at the dispensing outlet. In FIG. 4 the faucet valve is in the same position as described for FIG. 2.

FIG. 5 illustrates the second operational mode as mentioned above, namely the hot water mode for the dispenser shown in FIGS. 3 and 4. In FIG. 5 the faucet is in an off position. Valve 50 is in its rotary position in which both the cold water passage 70 and the cold water return port 66 are blocked. With the port 66 closed, there is no water flow from conduit 86 into valve chamber 92. However, instant hot water port 72 is always in communication with instant hot water line 62, so that instant hot water can flow through the faucet, subject only to the control of valve 100. Upon actuation of the valve 100, cold water from conduit 102 is routed through the valve 100 to conduit 104 and the lower part of conduit 86 which forces instant hot water through the instant hot water outlet conduit 74 through ports 62 and 72 and into passage 58 in the valve and thence to the inside hot water conduit 16 of spout 14. Thus in the FIG. 5 mode, instant hot water only is dispensed from the dispensing spout 28. Although cold water flow to the chamber 92 is blocked in the FIG. 5 mode, cool water 107 remains present in the inclined water jacket 20 for a substantial portion of its length. This prevents heating of the exterior surface 109 of the spout.

In the previously described embodiments, only the cold water supply of the building plumbing system was utilized. The only source of hot water in such embodiment is the instant hot water tank 80, both for instant hot water close to the boiling point, and for mixing with the cold water to produce warm water. This arrangement has utility where only small amounts of hot water are needed at the point of dispensing. However, where large amounts of hot water are needed at the point of dispensing, the FIG. 6 embodiment is utilized. The embodiment shown in FIG. 6 is similar to that shown in FIGS. 3, 4 and 5 but includes a conduit 208 connecting the dispensing faucet to a conventional remote hot water heater 210 of the building plumbing system. The spout 14 contains the two passages 16 and 20 and a dispensing outlet 222. The faucet valve 150 is operable to provide plumbing system hot water from the conventional tank 210 through pipe 208, port 215 in seat 16, port 216 in valve core 152 to chamber 192. Plumbing system cold water is supplied to the faucet from conduit 214 through port 217 in seat 160 and passage 170 in valve core 152 to chamber 192. When valve 150 is turned so that neither ports 216 and 170 in valve core 152 register with ports 215, 217 in seat 160, the plumbing system water supply is completely turned off. Actuation of valve 100 will supply instant hot water from tank 80 to the spout through tube 16. If either plumbing system hot or cold water, or a mixture thereof is to be dispensed, valve 150 is turned to register valve core ports 216, 170 partially or fully with their seat ports 215, 217, thus to dispense the selected temperature water through passage 20 in spout 14.

In the embodiment illustrated in FIG. 6, the core 220 of the dispensing outlet 222 serves only to provide a passage for the instant hot water because instant hot water is not mixed with plumbing system water. Thus a conventional aerator 224 can be employed rather than the dispensing head shown in FIG. 1. The conventional aerator has a disc 226 with a plurality of small diameter holes. Because of the back pressure resulting from the small holes, a check valve 105 is employed to prevent water flow from the dispensing head into and down passage 16 which would force water through tube 74 and cause the tank 80 to be filled and also force water out the vent pipe 103.

From the foregoing description, it is clear that the same basic structure is utilized from all embodiments of the invention. Various additions or modifications are made to increase or change the utility of the apparatus.

I claim:

1. An instant hot water dispenser system comprising a dispensing spout having a dispensing outlet, an instant hot water passage and a plumbing system cold water passage, said passages communicating with said dispensing outlet, valve means controlling said passages and having a first valve position and a second valve position to provide a mix of cold water and instant hot water, an instant hot water tank, means for coupling said valve means to said instant hot water tank, said valve means including a chamber, said chamber being in communication with said cold water passage and in communication with a source of plumbing system water, conduit means connecting said chamber to said tank to deliver cold water from said chamber to said hot water tank, fluid flow restrictor means in said dispensing outlet to restrict cold water flow therethrough and when said valve is in said second position, said restriction means causes water pressure in said chamber to cause water flow through said conduit means after cold water exits from said dispensing outlet to displace water from said instant hot water tank to be mixed with said cold water exiting said dispensing outlet to provide a warm water mix.

2. The dispenser system of claim 1 in which said plumbing system water source comprises hot and cold water supply lines, said valve means further comprising means for supplying hot or cold water from said lines selectively to said plumbing system passage, or mixtures thereof, independently of the supply of instant hot water to said instant hot water passage.

3. The dispenser system of claim 1 in which said plumbing system water passage constitutes a water jacket between said instant hot water passage and persons using said spout.

4. An instant hot water dispenser system comprising a source of instant hot water, a dispensing spout having an outlet therein, an instant hot water passage and a plumbing system water passage communicating with said outlet, first valve means controlling said passages, said first valve means including a chamber in constant communication with said spout for all valve positions, and second valve means associated with said source of instant hot water, said second valve means being operable to discharge instant hot water from said hot water source to said valve chamber, means for coupling said first valve means to said source of instant hot water and to a source of plumbing system hot water and plumbing system cold water, said first valve means having a plurality of selective positions to supply one of plumbing system water only to said plumbing system water passage, an instant hot water and plumbing system water mix and instant hot water only, and said second valve means being operable to supply instant hot water through said spout in all positions of said first valve means.

5. The dispenser system of claim 4 in which said plumbing system water passage constitutes a water jacket between said instant hot water passage and persons using the spout.

6. The dispenser system of claim 4 in which said dispensing spout has a mixing head at its end and to which said instant hot water passage and said plumbing system water passage lead.

7. The dispenser system of claim 4 a conduit connecting said tank to said first valve means to supply instant hot water to said chamber in said first valve means, and a check valve in said conduit to prevent back flow from said chamber to said tank.

8. A water dispenser including a spout having a dispensing outlet, said spout comprising an instant hot water passage communicating with said dispensing outlet, a plumbing system water passage forming an insulative water jacket about said instant hot water passage and communicating with said dispensing outlet, valve means connected to said instant hot water passage and said plumbing system water passage, means for coupling said valve means to a source of plumbing system water, an instant hot water storage tank located proximate said valve means and having an outlet connected to said valve means, said valve means comprising means selectively operable in first and second modes for respectively supplying plumbing system water only through said plumbing system water passage to said dispensing outlet and for supplying both plumbing system water and instant hot water to provide a warm water mix at the dispensing outlet, with said valve means being operable in said second mode to supply plumbing system water first through said outlet followed by a mix of plumbing system water and instant hot water.

9. A water dispenser in accordance with claim 8 wherein said valve means comprise means operable to provide a third operational mode with instant hot water discharge only through said dispensing outlet.

10. A water dispenser in accordance with claim 9 wherein said instant hot water passage extends from said valve to said dispensing outlet and said plumbing system water passage is partially filled with water during said third mode to insulate said instant hot water passage.

11. A water dispenser in accordance with claim 9 wherein said dispensing outlet comprises a dispensing head having a hollow central core spaced from and located within a dispenser head outer wall to form a plumbing system water discharge passage with the plumbing system water discharge passage in communication with said water jacket and said hollow core in communication with said instant hot water passage for discharge of instant hot water centrally of said dispensing head and inside the plumbing system water discharge and flow diverter means in said plumbing system water discharge passage to cause turbulent flow of plumbing system water around said core for mixing with instant hot water exiting said hollow central core.

12. An instant hot water dispenser system including an instant hot water tank and source of plumbing system water, the improvement comprising a faucet having a spout and valve means operable in a first valve position to provide a plumbing system water discharge only and a second valve position to provide a warm water mix, a conduit connecting said instant hot water tank to said valve means and means connecting said valve means to said source of plumbing system water and wherein the spout has wall means defining first and second passages communicating at one end with a common dispensing outlet and said passages communicating with said valve means, said faucet including means operable when said valve is in said second position to initially cause flow of plumbing system water through said first passage to said dispensing outlet to supply an initial cold water discharge from said outlet and subsequently cause plumbing system water flow to said instant hot water tank to displace hot water from said tank to cause a flow of instant hot water through said second passage to mix with the plumbing system water at said outlet and provide a nonscalding warm water discharge.

13. An instant hot water dispenser system in accordance with claim 12 wherein said first and second passages have respectively first and second exit ports in said dispensing outlet said exit ports being axially spaced to prevent flow from one of said exit ports into the other of said exit ports.

14. A water dispenser in accordance with claim 13 wherein said dispensing outlet comprises a dispensing head having a hollow central core which forms said first exit port which is spaced from and located within a dispenser head outer wall to form said second exit port around the core to afford flow of plumbing system water around the core and hot water through the core.

15. A water dispenser system comprising an instant hot water tank having an inlet and an outlet, a dispensing spout having first and second passages, valve means controlling said passages, means for coupling said valve means to said instant hot water tank inlet and to a source of plumbing system water, said valve means being operable in one mode to simultaneously supply plumbing system water to said instant hot water tank inlet to force water from said tank outlet into one of said spout passages and to deliver plumbing system water to the other of said passages, with said plumbing system water exiting from said spout first followed by a mix of said plumbing system water and instant hot water.

16. A dispensing system in accordance with claim 15 wherein said valve means has a chamber, said chamber being in communication in said one mode with said plumbing system water said spout first passage and said tank inlet with the plumbing system water pressure causing water flow into said first passage and said tank inlet.

* * * * *